United States Patent [19]

Greiner et al.

[11] Patent Number: 4,813,599

[45] Date of Patent: Mar. 21, 1989

[54] ELECTROMAGNETICALLY ACTUATABLE FUEL INJECTION VALVE

[75] Inventors: Max Greiner, Gerlingen; Udo Hafner, Lorch; Waldemar Hans, Bamberg; Heinrich Knapp, Leonberg; Wolfgang Kramer, Kemmern; Rudolf Krauss, Stuttgart; Ferdinand Reiter, Markgroningen; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 62,983

[22] Filed: Jun. 17, 1987

[30] Foreign Application Priority Data

Aug. 30, 1986 [DE] Fed. Rep. of Germany ....... 3629646

[51] Int. Cl.[4] ......................... B05B 1/30; F16K 31/10

[52] U.S. Cl. .................................... 239/456; 239/585; 251/129.18

[58] Field of Search ........ 239/453, 451, 533.3–533.12, 239/585, 600, 456; 251/129.18, 129.15

[56] References Cited

U.S. PATENT DOCUMENTS

| | | | |
|---|---|---|---|
| 2,602,703 | 7/1952 | Camner | 239/533.7 |
| 4,373,671 | 2/1983 | Giardini | 239/585 |
| 4,394,971 | 7/1983 | Gaskell | 239/453 |
| 4,653,720 | 3/1987 | Knapp et al. | 239/585 X |
| 4,704,591 | 11/1987 | Hafner | 251/129.15 X |
| 4,708,289 | 11/1987 | Szablewski et al. | 239/451 X |

FOREIGN PATENT DOCUMENTS

| | | | |
|---|---|---|---|
| 447743 | 3/1935 | United Kingdom | 239/533.11 |
| 2054033 | 2/1981 | United Kingdom | 239/456 |

*Primary Examiner*—Douglas C. Butler
*Assistant Examiner*—Mary Beth O. Jones
*Attorney, Agent, or Firm*—Edwin E. Greigg

[57] ABSTRACT

The invention relates to an electromagnetically actuatable fuel injection valve which is used to supply fuel to a mixture compressing internal combustion engine. The fuel injection valve comprises a valve housing provided with an extension in which a valve seat body is disposed. A magnetic coil is mounted on each of the pole parts and a permanent magnet is disposed between the poles of the pole parts. The valve seat body is connected to a guide via a collet. The guide, collet and valve seat body are penetrated by a valve needle which is connected at its one end to an armature and which, at its other end, ends in a closing end. In the guide is a guide bore which is adapted to radially guide a spherical head portion of the valve needle and which then tapers into an abutment face, against which face the valve needle rests by way of the head when the injection valve is open. To open the valve, the valve needle is moved outwardly, thereby uncovering an ejection opening between a valve seat and the closing head. The valve seat body and collet may be screwed together for the purpose of adjusting the valve stroke.

11 Claims, 1 Drawing Sheet

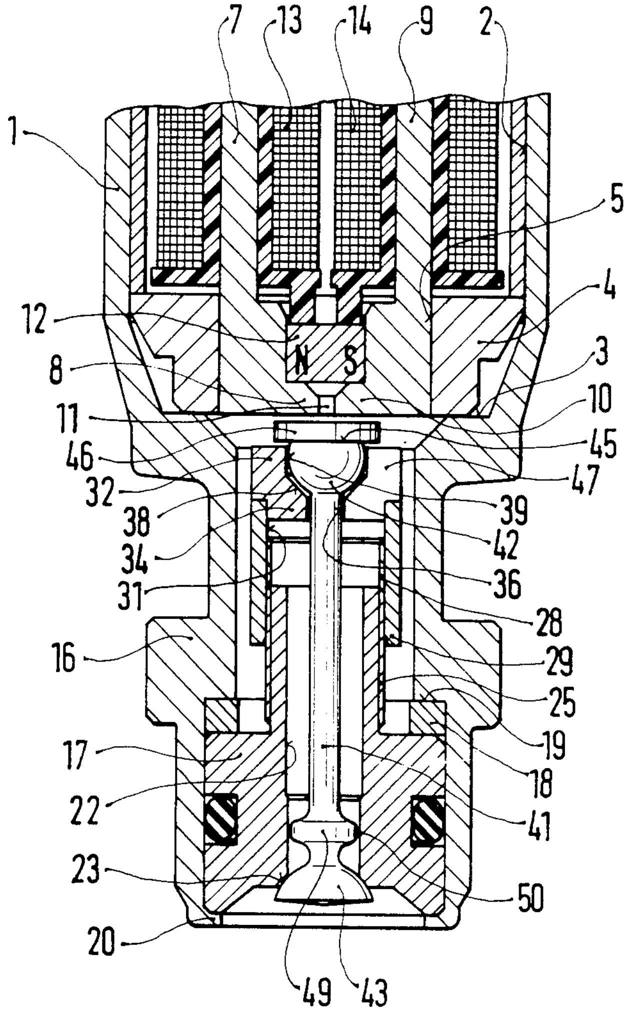
7
13
14
9
2
1
5
4
12
N
S
3
8
10
11
45
46
47
32
39
38
42
34
36
31
28
16
29
25
19
17
18
22
41
23
50
20
49
43

ELECTROMAGNETICALLY ACTUATABLE FUEL INJECTION VALVE

FIELD OF THE INVENTION

The invention relates to improvements in electromagnetically actuatable fuel injection valves.

BACKGROUND OF THE INVENTION

An electromagnetically actuatable fuel injection valve is already known (U.S. Pat. No. 4,653,720) wherein the valve stem of the valve moves outwardly when the valve is opened and wherein the closing head of the valve moves inwardly to rest against the valve seat. During assembly of this type of fuel injection valve the valve needle is passed from without through the valve seat and then secured to the armature as an operative unit. After this securing operation no further adjustment of the valve opening stroke can be made. Furthermore, if the securing joint is not satisfactory, the valve needle and armature may come apart. The valve needle then could possibly fall out of the fuel injection valve and fall into the combustion chamber of the engine, thereby causing serious engine damage.

OBJECT AND SUMMARY OF THE INVENTION

It is a principal object of the invention to avoid the potential for disassembly presented by prior art valves. The advantage of the electromagnetically actuatable fuel injection valve according to the present invention is that the valve needle cannot fall out of the injection valve.

It is another object of the invention to provide a fuel injection valve that is easy to assemble and in which adjustment of the valve opening stroke can be made after the valve assembly has been put together. The armature and valve needle can be joined together in a readily accessible form and then the opening stroke of the valve needle can be accurately adjusted independently of the axial position of the armature and valve needle with respect to one another.

It is yet another object of the invention and particularly advantageous for the parts guiding the valve needle to be designed so that they can be axially screwed together. As a result, ready adjustment of the valve opening stroke can be obtained.

The invention will be better understood and further objects and advantages thereof will become more apparent from the ensuing detailed description of preferred embodiments taken in conjunction with the drawings.

BRIEF DESCRIPTION OF THE DRAWINGS

A preferred embodiment of the invention is shown in partial section in a simplified form in the sole figure of drawings. The drawing will be described in more detail hereinafter in connection with a description of construction and operation of the fuel injection valve of the invention.

DESCRIPTION OF THE PREFERRED EMBODIMENT

The fuel injection valve which is represented in the drawing and which is intended for a fuel injection system of a mixture-compressing, externally ignited internal combustion engine comprises a valve housing 1 having a stepped housing bore 2 provided with a first shoulder 3, on which a base plate 4 comes to rest. A first pole part 7 with a first angled pole 8 and a second pole part 9 with a second angled pole 10 project into an intermediate recess 5 of the base plate 4. The poles 8 and 10 which are oriented in opposed relation towards one another, define between them a polar air gap 11 which is partially bridged by a permanent magnet 12. Within the housing bore 2, a first magnetic coil 13 is disposed on the first pole part 7 and a second magnetic coil 14 is disposed on the second pole part 9. The magnetic coils 13 and 14 are disposed above the poles 8, 10.

Adjacent to the region receiving the magnetic coils 13,14, the valve housing comprises an extension 16 of reduced diameter. The housing bore 2 continues with reduced diameter in this extension 16 which is arranged to receive a valve seat body 17, the valve seat body coming to rest via an intermediate ring 18 against a second shoulder 19 of the housing bore 2. The end of the extension 16 opposite to the magnetic coils 13,14 partially encloses the valve seat body 17 in the form of an annular flange 20; and the flange serves to press the valve seat body 17 in the direction of the second shoulder 19 against the intermediate ring 18. The valve seat body 17 includes a continuous flow bore 22, disposed axially thereof, which bore terminates in a fixed valve seat 23 formed inwardly on a first part of the valve seat body 17. The second part of the valve seat 17 disposed upstream of the intermediate ring 18 has a smaller diameter than the first part disposed downstream of the intermediate ring 18 and that second part is equipped with an external thread 25.

The external thread 25 of the valve seat body 17 is in engagement with an inner thread 28 of a collet 29 which inner thread is provided over a first portion of a bore 31, the second unthreaded portion of the bore 31 having a larger diameter than the diameter of the inner thread 28.

A cylindrical guide means 32 is disposed against the upstream face of the collet 29 so as to lay opposite the poles 8, 10. At its end oriented towards the valve seat body 17, the guide means 32 ends in a cylindrical part 34 having a reduced diameter approximately the same as the diameter of the bore 31 of the collect 29. The guide means 32 is centered by its cylindrical part 34 in the bore 31 of the collet 29.

The guide means 32 is axially penetrated by a cylindrical bore which has three stages: a continuous bore 36, which leads, at the end disposed away from the valve seat 23, to a sloped abutment face 38, the diameter of which expands conically and merges into an adjacent cylindrical guide bore 39. Accordingly, the cylindrical guide bore 39 opens in the direction of the poles 8, 10.

The valve seat body 17, collet 29 and guide means 32 are penetrated with ample play by a valve needle 41 whose end lying opposite the poles 8, 10, takes the form of a spherical head 42 which is slidably mounted with minimum radial play in the guide bore 39 of the guide means 32. Because of its spherical shape, the head 42 is also pivotable within the guide bore 39. At its opposite end the valve needle 41 ends in the form of a hemispherical closing head 43 having a face adapted to cooperate with the valve seat 23. Opposite the poles 8, 10, the spherical head 42 is provided with a flattened zone 45 to which a cylindrical armature plate 46 made of ferromagnetic material is attached. To allow for installation of the above-described valve unit, there is provided in the guide means 32 a radially extending slot 47 which begins on the outer surface of the guide means 32 and which extends to the continuous bore 36, abutment face 38 and guide bore 39. The width of the slot 47 is slightly greater than the diameter of the valve needle 41 in the region downstream of the head 42. When the fuel injection valve is in operation the fuel passes via the slot 47 to the flow bore 22 and from there to the valve seat 23. Directly upstream of the closing head 43, a metering collar 49 may be provided on the valve needle 41. The metering collar 49 constitutes with the wall of the flow bore 22 a throttling point for the fuel and defines therewith an annular metering gap 50 at which a large part of the pressure of the fuel is reduced with respect to the ambient pressure prevailing downstream of the valve seat 23. The remainder of the fuel pressure relative to the ambient pressure is removed at the flow cross-section between the valve seat 23 and the closing head 43.

When the magnetic coils 13, 14, are not excited, the cylindrical armature plate 46 is pulled by the permanent magnetic field of the permanent magnets 12 in the direction of the poles 8, 10. However, when the closing head 43 rests against the valve seat 23, the armature plate 46 still has an air gap with respect to the poles 8, 10. In this position the conical head 42 is raised from the abutment face 38. The radial guiding of the spherical head 42 is effected on its periphery by virtual contact with the guide bore 39. The radial centering of the valve needle 41 is effected through the positioning of the closing head 43 against the valve seat 23.

When the magnetic coils 13, 14, are excited, the permanent magnetic flow initiated by the permanent magnets 12 at the armature plate 46 is opposed by an electromagnetic flow of approximately equal magnitude and, as a result, the pressure of the fuel acting on the armature plate 46 and the valve needle 41 is sufficient to raise the closing head 43 from the valve seat 23 and to cause the spherical head 42 to be depressed until it rests against the abutment face 38. During actuation of the fuel injection valve, i.e., when the closing head 43 is lifted outwardly from the valve seat 23, the fuel flowing to the valve seat 23 also centers the valve needle 41 in the flow bore 22.

Adjustment of the working stroke of the valve needle 41 is obtained by rotating the collect 29 relative to the valve seat body 17. As a result, the distance is also changed between the abutment face 38 and the spherical head, and accordingly the distance between the valve seat 23 and the closing head can be changed, and thus, the working stroke of the valve needle 41. This adjustment is effected before installation of the fuel injection valve. Once the adjustment has been determined it can be fixed, for example, by caulking or otherwise securing the collet 29 in the external thread 25 of the valve seat body 17.

The above-described valve unit is installed as follows:

In a first step the valve needle 41, with the spherical head 42 leading, is passed through the flow bore 22 of the valve seat body 17 and connected on the flat part 45 of the spherical head 42 to the cylindrical armature plate 46, possibly by soldering or welding. In a second step the collet 29 is screwed on the valve seat body until it abuts against the external thread 25 of the valve seat body 17. However, this step could also be done prior to step one. In a third step the guide means 32 with its slot 47 is pushed over the part of the valve needle 41 disposed downstream of the spherical head 42 and is then axially displaced until the head 42 rests against the abutment face 38. In a fourth and final last step the collet 29 and the valve seat body 17 are rotated oppositely to one another until the collet 29 rests against the guide means 32, the axial play of the valve needle 41 desired for adjustment of the valve being observed. As previously mentioned, the collet can then be secured to the external threads on the valve seat body by caulking the collet 29.

The invention is certainly not limited to the embodiment which has been described. The guide means alternatively can be screwed to the collet, the latter resting against the valve seat body at its other end. Furthermore, instead of screwing the parts together, other connection methods can be employed, for example, a detent system, a bayonet closure or caulking of the parts.

The foregoing relates to preferred exemplary embodiments of the invention, it being understood that other variants and embodiments thereof are possible within the spirit and scope of the invention, the latter being defined by the appended claims.

What is claimed and desired to be covered by letters patent of the United States is:

1. An electromagnetically actuatable fuel injection valve comprising a valve housing, at least one magnetic coil, an armature and a valve seat body disposed within said valve housing, said valve housing being provided with an extension within which said valve seat body is received, said valve seat body being provided with a valve seat and a flow bore through which a valve needle is received for connection to the armature, guide means connected to a collet means and disposed between said collet means and said armature, said valve needle being arranged for movement relative to said guide means outwardly of said valve seat body so as to lift a closing head of said valve needle off said valve seat to open said fuel injection valve, said valve needle being provided directly downstream of the armature with a head portion and arranged to slide in a guide bore provided in said guide means, said collet means and said valve seat body being adjustably interconnected by screw connection means, and opening movement of the valve needle being limited by said head portion of said valve needle and an abutment face into which the guide bore tapers, the guide means being coaxially retained relative to said valve needle and axially secured with respect to the valve seat and said armature.

2. A fuel injection valve as claimed in claim 1, further wherein the guide means is provided with a radially extending slot whose width is greater than the diameter of the valve needle immediately downstream of the head.

3. A fuel injection valve as claimed in claim 2, further wherein said screw connection means includes screw threads on said collet, one end of said collet rests against one end of said guide means and the other end of said collet is screwed to the valve seat body.

4. A fuel injection valve as claimed in claim 3, further wherein said screw connection is effected by providing an inner thread on the collet and an external thread on a portion of an axial extent of said valve seat body.

5. A fuel injection valve as claimed in claim 3, further wherein said guide means includes an end portion of a reduced diameter complemental to a diameter of a collet bore provided in said collet and said end portion of said guide means is disposed in said collet bore.

6. A fuel injection valve as claimed in claim 1, further wherein said screw connection means includes screw threads on said collet, one end of said collet rests against one end of said guide means and the other end of said collet is screwed to the valve seat body.

7. A fuel injection valve as claimed in claim 6, further wherein said screw connection is effected by providing an inner thread on the collet and an external thread on a portion of an axial extent of said valve seat body.

8. A fuel injection valve as claimed in claim 6, further wherein said guide means includes an end portion of a reduced diameter complemental to a diameter of a collet bore provided in said collet and said end portion of each guide means is disposed in said collet bore.

9. A fuel injection valve as claimed in claim 1, further wherein said head portion of said valve needle is substantially spherical and provided with a flattened top to which said armature is secured.

10. A fuel injection valve as claimed in claim 1, further wherein said guide bore is cylindrical and said abutment face tapers conically from said guide bore to a central bore disposed in said guide means.

11. An electromagnetically actuatable fuel injection valve comprising a valve housing, at least one magnetic coil, an armature and a valve seat body disposed within said valve housing, said valve housing being provided with an extension within which said valve seat body is received, said valve seat body being provided with a valve seat and a flow bore through which a valve needle is received for connection to the armature, guide means connected to a collet means and disposed between said collet means and said armature, said valve needle being arranged for movement relative to said guide means outwardly of said valve seat body so as to lift a closing head of said valve needle off said valve seat to open said fuel injection valve, said valve needle being provided directly downstream of the armature with a head portion and arranged to slide in a cylindrical guide bore provided in said guide means, said collet means and said valve seat body being variably adjustable longitudinally, and opening movement of the valve needle being limited by said head portion of said valve needle and a central abutment face which tapers conically from said guide bore, said guide means being coaxially retained relative to said valve needle and axially secured with respect to the valve seat body, said collet means and said armature.

* * * * *